Dec. 11, 1934.  L. LARSON ET AL  1,983,983
AUTOMOBILE BODY
Filed April 3, 1934  3 Sheets-Sheet 1
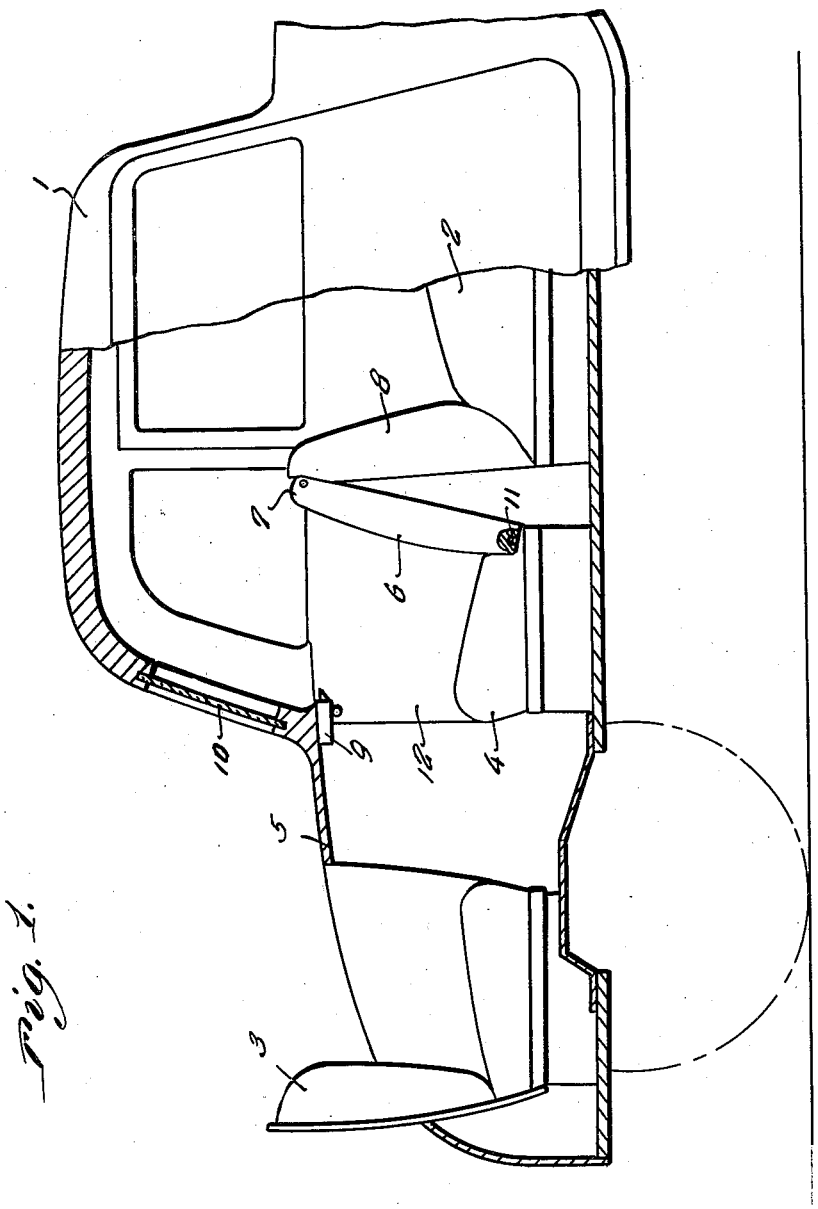
Inventors
*Louis Larson*
*Edward Johnstone*
By *Clarence A. O'Brien*
Attorney Dec. 11, 1934.   L. LARSON ET AL   1,983,983
AUTOMOBILE BODY
Filed April 3, 1934   3 Sheets-Sheet 2
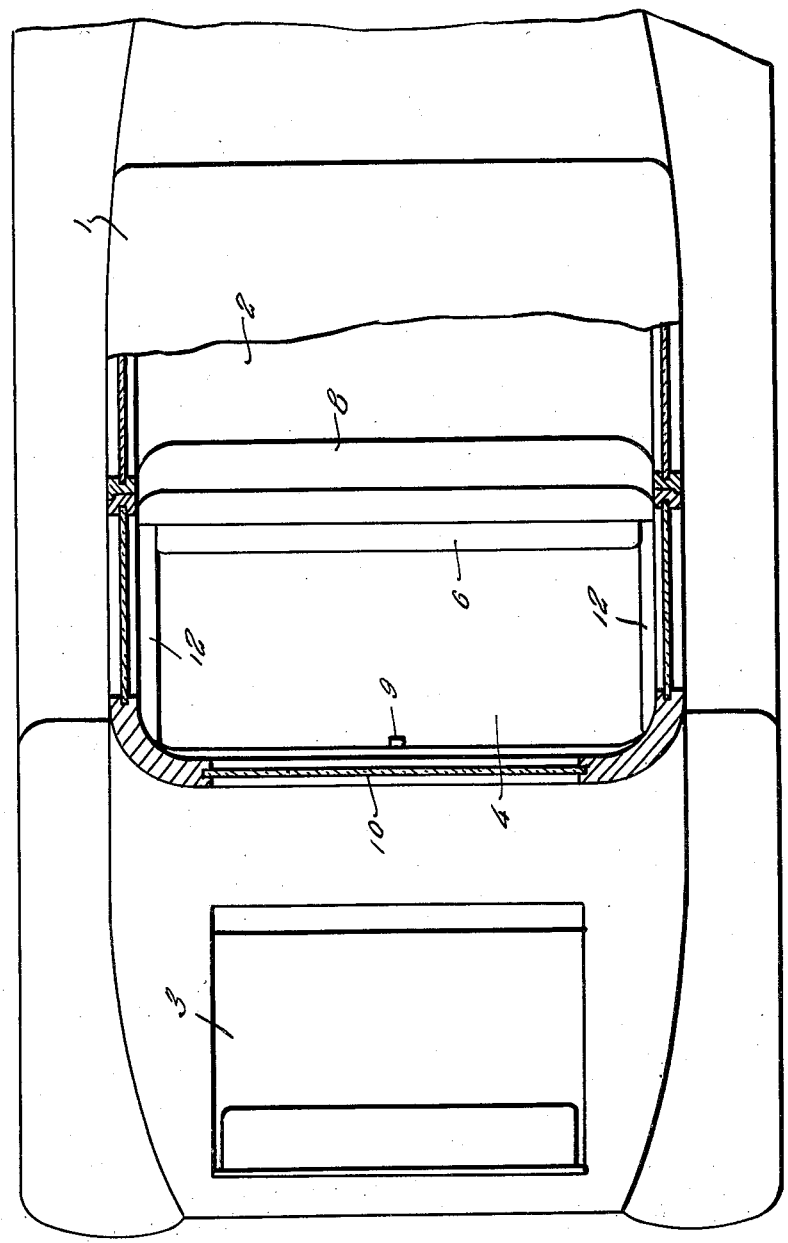

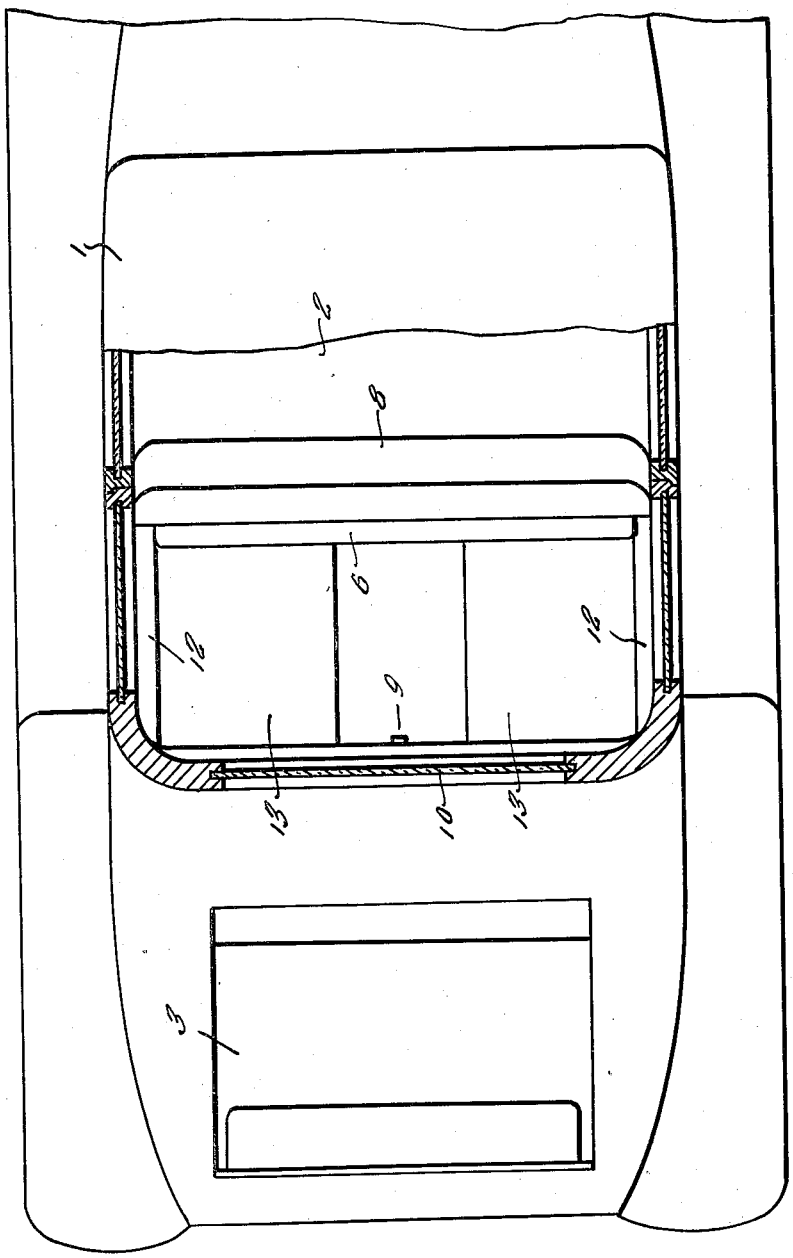

UNITED STATES PATENT OFFICE 1,983,983

AUTOMOBILE BODY

Louis Larson and Edward Johnstone,
Katonah, N. Y.

Application April 3, 1934, Serial No. 718,870

3 Claims. (Cl. 296—63)

The present invention relates to new and useful improvements in automobile bodies of the coupé and roadster type and has for its primary object to utilize the space immediately behind the front or operator's seat and within the body proper for the carrying and seating of passengers, and this without the necessity of lengthening the body or changing the external appearance thereof.

Another important object of the invention is to provide an automobile body of the aforementioned character embodying a novel construction and arrangement whereby the space immediately behind the operator's seat may be utilized for passengers or for parcels or other articles.

Other objects of the invention are to provide an automobile body of the character described which will be strong, durable, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view showing a portion of the body broken away in section to illustrate one embodiment of the seating arrangement constituting the present invention.

Figure 2 is a view in top plan thereof, the body being broken away in horizontal section.

Figure 3 is a top plan view of another embodiment of the invention, the body being broken away in horizontal section to expose the seats constituting the present invention.

Referring now to the drawings in detail, it will be seen that the reference numeral 1 designates an automobile body of the coupé type having mounted therein, as usual, an operator's seat 2. The reference numeral 3 designates the usual rumble seat with which the body may or may not be equipped.

The present invention comprises a seat 4 mounted in the body 1 immediately to the rear of the operator's seat 2 and within the body proper or, in other words, forwardly of the rear deck 5 of said body, as illustrated to advantage in Figure 1 of the drawings. The seat 4 includes an upholstered combination back rest and shelf 6 which is pivotally mounted, as at 7, on the back 8 of the operator's seat 2.

Any suitable means may be provided for securing the member 6 in raised or lowered position. For example, a suitable latch 9 may be provided in the body 1 beneath the rear window 10 thereof for securing said member 6 in raised position where it functions as a shelf or support for parcels or other articles, said member 6 being provided with a socket 11 which receives the latch 9. The reference numeral 12 designates cushions on the side walls of the body 1 for the comfort of passengers occupying the seat 4.

In the form of the invention illustrated in Figure 3 of the drawings, spaced individual passenger seats 13 are provided in the rear of the operator's seat 2, which arrangement permits the occupants of said seats to either face each other or to face the rear of the car, as desired. In this form of the invention the cushions 12 constitute back rests when the passengers face each other and the back member 6, together with the back 8 of the operator's seat, may serve as a convenient arm rest for the comfort of the passengers occupying the seats 13.

Access may be had to the seats constituting the present invention either from the rumble seat 3 beneath the deck 5 or over the back 8 of the operator's seat 2. Or, if desired, one of the doors of the body 1 may be widened sufficiently to permit entrance to the additional seats thus provided, or a comparatively small additional door may be provided on one side of the body 1. When the seats 4 or 13 are not occupied by passengers, articles or parcels may be placed in this space, or the back member 6 may be swung upwardly to raised position to function as a shelf for supporting said articles or parcels.

It is believed that the many advantages of an automobile body constructed in accordance with the present invention will be readily understood, and although preferred embodiments of the invention are as illustrated and described, it is to be understood that further modifications or changes in the details of construction and in the combination and arrangement of parts may be resorted to which will fall within the scope of the invention as claimed.

What is claimed is:—

1. In an automobile body having a rear deck, an operator's seat, another seat mounted in the body rearwardly of said operator's seat, and a member hingedly mounted on the operator's seat and adapted to function selectively as a back rest for the second named seat or as a supporting shelf to the rear of the operator's seat, an interengaging latch means on said member and the deck for releasably supporting said member in shelf-functioning position, bridging the space between the deck and the back of the operator's seat.

2. In an automobile body, an operator's seat including a fixed back, spaced seats in the body rearwardly of the operator's seat, cushions mounted on the side walls of the body and constituting back rests for the second-named seats, and a member pivotally mounted on the back of the operator's seat for swinging movement to raised and lowered positions, said member, when in raised position, constituting an article support rearwardly of the operator's seat and, when in lowered position, constituting a back rest for the second-named seats.

3. In an automobile body of the coupé type, a passenger compartment wholly within the cabin of the body between the operator's seat and the rear deck of the body, said passenger compartment having therein means for seating the occupant thereof and a member normally bridging the space between the back of the operator's seat and the deck and serving as an article supporting shelf, said member being pivoted at one edge to the back of the operator's seat and adapted to be swung inwardly of the aforementioned compartment to serve, in the latter position, as a back rest, and means for releasably securing said member in shelf functioning position.

LOUIS LARSON.
EDWARD JOHNSTONE.